US011995082B2

(12) United States Patent
Chen et al.

(10) Patent No.: US 11,995,082 B2
(45) Date of Patent: May 28, 2024

(54) SYSTEMS AND METHODS FOR PROVIDING FASTER DATA ACCESS USING LOOKUP AND RELATIONSHIP TABLES

(71) Applicant: MicroStrategy Incorporated, Tysons Corner, VA (US)

(72) Inventors: Yinong Chen, Sterling, VA (US); Shiliang Wang, Vienna, VA (US); Yuliyan Kiryakov, McLean, VA (US); Ananya Ojha, Dunn Loring, VA (US)

(73) Assignee: MICROSTRATEGY INCORPORATED, Tysons Corner, VA (US)

(*) Notice: Subject to any disclaimer, the term of this patent is extended or adjusted under 35 U.S.C. 154(b) by 266 days.

(21) Appl. No.: 17/453,672

(22) Filed: Nov. 5, 2021

(65) Prior Publication Data
US 2023/0145273 A1 May 11, 2023

(51) Int. Cl.
*G06F 16/24* (2019.01)
*G06F 16/2453* (2019.01)
*G06F 16/901* (2019.01)
*G06N 20/00* (2019.01)

(52) U.S. Cl.
CPC .... *G06F 16/24542* (2019.01); *G06F 16/9017* (2019.01); *G06N 20/00* (2019.01)

(58) Field of Classification Search
CPC .............. G06F 16/24542; G06F 16/9017
See application file for complete search history.

(56) References Cited

U.S. PATENT DOCUMENTS

| | | | |
|---|---|---|---|
| 10,170,135 B1* | 1/2019 | Pearce | G10L 25/03 |
| 11,715,051 B1* | 8/2023 | Baskaran | G06F 18/2178 |
| | | | 707/758 |
| 2020/0089652 A1* | 3/2020 | Jayaraman | G06N 20/00 |
| 2020/0202230 A1* | 6/2020 | Subramaniam | G06N 5/022 |
| 2020/0295879 A1* | 9/2020 | Jas | G06F 16/22 |
| 2021/0272069 A1* | 9/2021 | Douglas | G06F 16/9027 |
| 2021/0382896 A1* | 12/2021 | Viswanathan | G06F 16/1824 |
| 2022/0027379 A1* | 1/2022 | Unterbrunner | G06F 16/254 |
| 2022/0027792 A1* | 1/2022 | Cummings | G06N 20/00 |
| 2022/0229987 A1* | 7/2022 | Davasam Suryanarayan | |
| | | | G06N 5/01 |

* cited by examiner

*Primary Examiner* — Mohammad S Rostami
(74) *Attorney, Agent, or Firm* — Bookoff McAndrews, PLLC

(57) ABSTRACT

Disclosed are methods, systems, and computer-readable medium for providing query results. The query results may be provided more accurately and faster than via distributed tables. Disclosed techniques include receiving a plurality of tables comprising attributes and attribute data, the attribute data comprising attribute forms and attribute related information, identifying attributes and corresponding attribute data from each of the plurality of tables, applying a categorization machine learning model to categorize each attribute data as an attribute form or an attribute related information, generating the lookup table based on the attributes and the corresponding attribute forms, generating the relationship table based on the attributes and the corresponding attribute related information, receiving a query for attribute data, and generating a query response based on at least one of the lookup table or the relationship table.

20 Claims, 6 Drawing Sheets

FIG. 4A

Table 400:

| ITEM ID (402) | ITEM_DESC (404) | SEASON (406) | REVENUE (408) |
|---|---|---|---|
| 3 | APPLE | FALL | $10,000 |
| 1 | ORANGE | SPRING | $20,000 |
| 2 | PLUM | SUMMER | $30,000 |

Table 410:

| ITEM ID (402) | ITEM_NAME (404) | SUBCATEGORY (409) |
|---|---|---|
| 1 | ORANGE | CITRUS |

Table 420:

| ITEM NUMBER (402) | ITEM_DESC (404) | SUBCATEGORY (409) |
|---|---|---|
| 2 | PLUM | TART |
| 3 | APPLE | SWEET |

| ITEM ID | ITEM_DESC | SUBCATEGORY | SEASON | REVENUE |
|---|---|---|---|---|
| 1 | ORANGE | CITRUS | SPRING | $20,000 |
| 2 | PLUM | TART | SUMMER | $30,000 |
| 3 | APPLE | SWEET | FALL | $10,000 |

*FIG. 4B*

SYSTEMS AND METHODS FOR PROVIDING FASTER DATA ACCESS USING LOOKUP AND RELATIONSHIP TABLES

TECHNICAL FIELD

Various embodiments of the present disclosure relate generally to methods and systems for data access and storage management and, more particularly, to methods and systems for utilizing lookup and relationship tables to provide faster access to more complete data.

BACKGROUND

Organizations are generating and utilizing ever greater amounts of data. This data is processed and used in making decisions in business, government, and other settings. In many cases, large datasets are often exchanged with static information and significant operations may be needed to prepare datasets for use. For instance, processing of an online analytical processing (OLAP) cube may include the following: a client splits a cube into several tables comprising a large dataset; the client sends each table in sequence to a server executing a program to process the table in sequence; the client sends a script for each table to the server; the server applies the script to process the table; and the server sends back the processed table to the client. Such a process is inefficient as it can consume a large amount of time to join static tables especially when the large dataset is being transmitted repeatedly. Additionally, data associated with a given attributed may be distributed across multiple tables, each of which may be incomplete.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems, methods, and computer-readable medium are disclosed for decreasing data access times. For instance, a method may include: receiving a plurality of tables comprising attributes and attribute data, the attribute data comprising attribute forms and attribute related information; identifying attributes and corresponding attribute data from each of the plurality of tables; applying a categorization machine learning model to categorize each attribute data as an attribute form or an attribute related information; generating the lookup table based on the attributes and the corresponding attribute forms; generating the relationship table based on the attributes and the corresponding attribute related information; receiving a query for attribute data; and generating a query response based on at least one of the lookup table or the relationship table.

Furthermore, a system may include at least one memory storing instructions; and at least one processor executing the instructions to perform operations. The operations may include receiving a plurality of tables comprising attributes and attribute data, the attribute data comprising attribute forms and attribute related information; identifying attributes and corresponding attribute data from each of the plurality of tables; applying a categorization machine learning model to categorize each attribute data as an attribute form or an attribute related information; generating the lookup table based on the attributes and the corresponding attribute forms; generating the relationship table based on the attributes and the corresponding attribute related information; receiving a query for attribute data; and generating a query response based on at least one of the lookup table or the relationship table.

Moreover, a non-transitory computer-readable medium may store instructions that, when executed by a processor, cause the processor to perform operations. The operations may include: receiving a plurality of tables comprising attributes and attribute data, the attribute data comprising attribute forms and attribute related information; identifying attributes and corresponding attribute data from each of the plurality of tables; applying a categorization machine learning model to categorize each attribute data as an attribute form or an attribute related information; generating the lookup table based on the attributes and the corresponding attribute forms; generating the relationship table based on the attributes and the corresponding attribute related information; receiving a query for attribute data; and generating a query response based on at least one of the lookup table or the relationship table.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4A depicts tables with distributed information, according to one or more embodiments.

FIG. 4B depicts a combined lookup and relationship table, according to one or more embodiments.

DETAILED DESCRIPTION OF EMBODIMENTS

Figure 1:
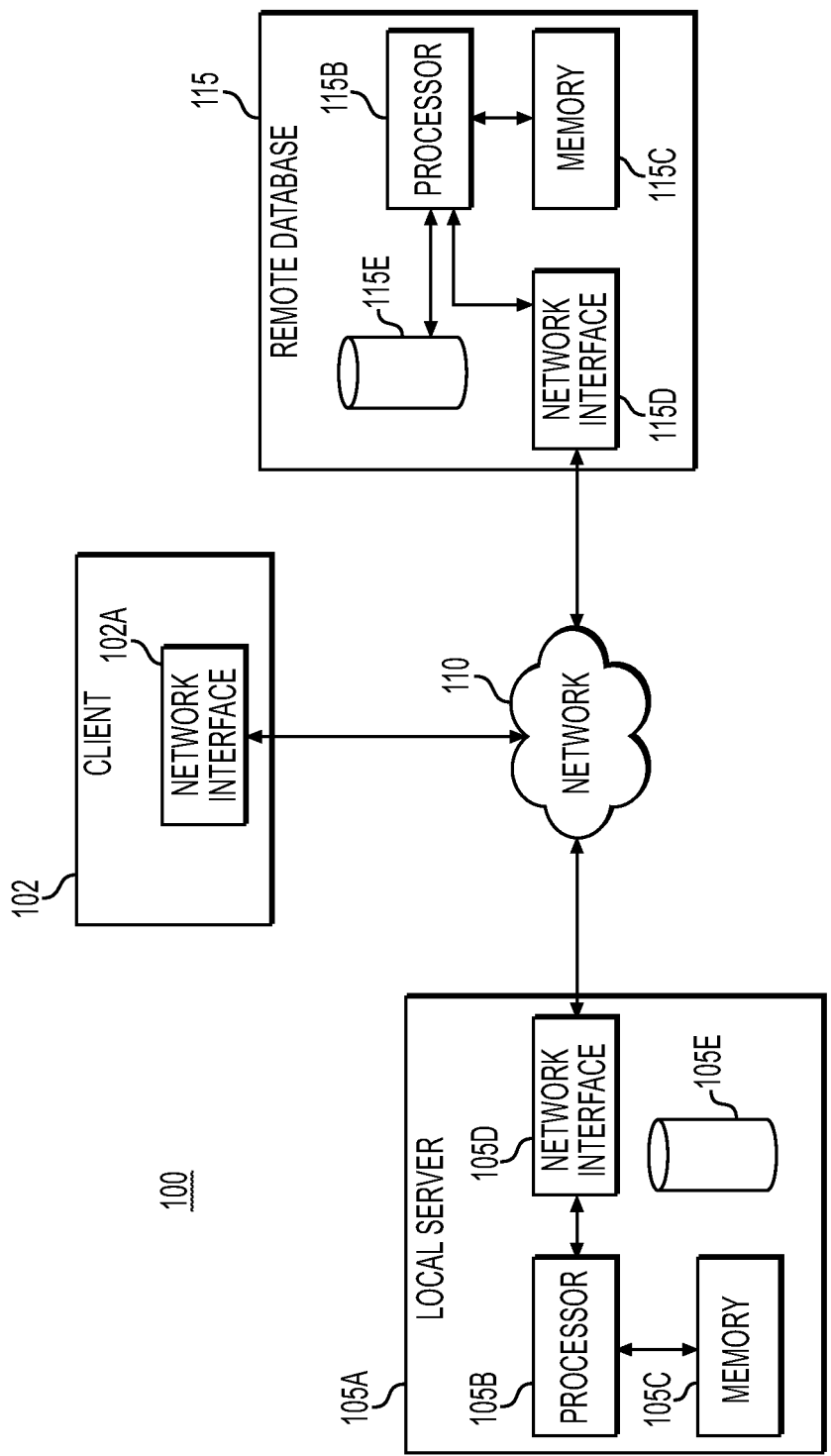
FIG. 1 depicts an exemplary block diagram of a system for generating lookup and relationship tables, according to one or more embodiments.

Various embodiments of the present disclosure relate generally to methods and systems for utilizing lookup and relationship tables for faster data access.

In general, techniques discussed herein are directed to increasing the speed and/or efficiency of report outcomes by using lookup and relationship tables. The lookup and relationship tables may also provide complete data as queries to one or more distributed tables may result in incomplete data results. The techniques provided herein provide for faster and accurate processing of data by, for example, using lookup and relationship tables that are generated using multiple data tables that may include distributed information. The distributed information is categorized and joined using, for example, machine learning techniques. The categorized information is used to generate lookup and relationship tables. The lookup and relationship tables include attributes and related data that can be accessed via a query. The lookup and relationship tables provide faster results than querying multiple distributed tables. The categorizing results in streamlined lookup and relationship tables, also increasing the speed of data retrieval.

The lookup and relationship tables disclosed herein may increase the speed and/or efficiency of report outcomes by providing faster access to attribute data and/or relationships via the lookup and relationship tables. Traditional techniques may respond to a query by searching for applicable information across a plurality of tables that include attributes and corresponding attribute data across the plurality of tables. As the traditional search requires obtaining data from the plurality of tables, such query responses may expend a large amount of computer resources and time. However, the techniques disclosed herein allow query responses to be generated using lookup and relationship tables that are generated based on the plurality of distributed tables, as discussed herein.

As applied herein, an attribute may be any attribute that is an object, event, service, etc. that is calculated, stored, analyzed, or applied by a system. An attribute may be associated with a given organization. An overall set of attributes associated with an organization may provide a holistic view of the identifiable operations of the organization. Non-limiting examples of attributes include sale items, services, individuals, entities, content, locations, establishments, or the like.

As applied herein, attribute data may be associated with an attribute and may include attribute forms and attribute related information. As applied herein, an attribute form may be data associated with an attribute having a one-to-one relationship with the attribute. An attribute from may be a characteristic that is specific to the attribute it is associated with such that it has a one-to-one relationship with the attribute. A one-to-one relationship may be a relationship that indicates that a given attribute from is associated only with a given attribute. For example, an item identifier may have a one-to-one relationship with an item such that the item identifier is only associated with the item. Non-limiting examples of attribute forms include identifiers, contact information, names, aliases, pointers, or the like.

As applied herein, attribute related information may be information related to an attribute that does not have a one-to-one relationship with the attribute. Non-limiting examples of attribute related information include time range, category, subcategory, age range, brand, risk tolerance, relative location, date, days to ship, first order date, last order date, order average, household count, income bracket, inventory, item, lifetime value score, marital status, month, month of year, order, payment method, phone plan, phone usage, promotion type, quarter, rush order status, salary, sales, revenue, ship date, shipper, status, store city, store country, store state, store zip code, subcategory, supply chain metrics, supplier, warranty, and year. Each attribute related information may have a value (e.g., a number, a string, a relationship, etc.) associated with it. Different item attribute related information or attribute related information values may be received from various sources (e.g., remote databases) in different tables. The attribute related information for a given attribute may be distributed across multiple tables.

As applied herein, a table may be any form of organized data such as the examples provided herein or such as a database, a cube, or the like. A cube may be a multi-dimensional cube that, for example, enables use of OLAP and/or business intelligence (BI) services features. The cube may share sets of data (e.g., in response to queries) among multiple reports to reduce repeat queries for the same or similar information.

A cube may manage a set of data that can be shared as a single in-memory copy. According to an implementation, a cube may include tags (e.g., names) associated with data to be used by a server. According to an implementation, one or more APIs may be used to provide a cube to a server for caching, such that lookup and/or relationship requests can be retrieved from the cache.

A client may request one or more reports related to the client organization's operations. The reports may be based on one or more attributes and may provide an insight into the client's operation. More specifically, the reports may be submitted by the client and a query may be generated to obtain the report results via a lookup and/or relationship table. In response to the query, the lookup and/or relationship table may output a report result based on attribute data (e.g., based on attribute forms and/or attribute related information). The report comprising the output may be provided to the client. The query based on the lookup and/or relationship tables may result in an output in a faster time than if the query was provided to a plurality of tables comprising distributed attribute data. According implementations, the output may be provided approximately 10% faster, 20% faster, 30% faster, 40% faster, 50% faster, 60% faster, 70% faster, 80% faster, or 90% faster than to a plurality of tables comprising distributed attribute data.

The embodiments disclosed herein provide performance improvement by decreasing the amount of bandwidth, resources, and time that is required in generating query results. By identifying attributes and corresponding attribute data, categorizing attribute data as an attribute form or attribute related information, and generating lookup and relationship tables, less data is transmitted over a network (e.g., between a querying entity and tables), and less time is expended in generating a report result (e.g., based on the reduction in tables and the reduction in data being transmitted across a network).

FIG. 1 depicts an exemplary block diagram of a system for utilizing lookup and relationship tables to provide faster access to data, according to one or more embodiments. A system 100 may include at least one client 102 with network interface 102A, a local server 105A, a network 110, and/or remote database 115. Although one remote database 115 is shown, it will be understood that one or more remote databases may be provided in system 100. While remote database 115 may interact with local server 105A, one of skill in the art would recognize that remote database 115 may also interact with one or more other local servers. Generally, while the functionality carried out by remote database 115 and/or local server 105A are discussed herein separately, in practice these features may be executed on more or fewer components. The client 102 may be in communication with local server 105A. Client 102 may be configured to request report results from and/or provide reports to run to local server 105A. Remote database 115 may be associated exclusively with client 102 or may be associated with multiple clients.

Local server 105A, and remote database 115 may be connected via network 110, using one or more standard communication protocols. Client 102 may be connected to local server 105A directly, via a network connection that is the same as network 110 or via a different connection. Network 110 may be one or a combination of a wide area network (e.g., the internet), a local network, or other network. Client 102, local server 105A, and remote database 115 may transmit and receive data, instructions, and/or other communications from each other across network 110 or one or more other connections (e.g., a connection between client 102 and local server 105A).

Local server 105A may include a processor 105B, a memory 105C, a network interface 105D, and/or a local cache 105E. Local server 105A may be a cloud server, a computer, a cell phone, a tablet, etc. Local server 105A may execute, by processor 105B, an operating system (O/S) and at least one application (each stored in memory 105C). The application may be desktop program, a browser program, or a mobile application program (which may also be a browser program in a mobile O/S). The application may manage local cache 105E, as discussed below, to store attributes (e.g., as smart lookup or relationship cubes) and/or retrieve the stored attributes for report execution. Network interface 105D may be a TCP/IP network interface for, e.g., Ethernet or wireless communications with network 110. Processor 105B, while executing an application, may (1) receive automated or manual inputs to initiate communication with remote database 115, and/or (2) perform operations in accordance with techniques described herein.

The application, executed by processor 105B of local server 105A, may process received distributed tables to identify attributes and corresponding attribute data, classify the attribute data, and generate lookup and/or relationship tables and/or a smart cube, such as for an analytics platform. A smart cube (e.g., an OLAP cube) may be a multi-dimensional array of data including related tables that include a lookup and/or relationship table. For example, local server 105A may receive distributed tables from any of various sources and/or formats, such as spreadsheets, comma-separated value (CSV) files, customer relationship management (CRM) systems, office productivity software, cloud computing platforms, and so on. These various sources may correspond to remote database 115 and/or other sources. The imported data may be structured or unstructured data. Local server 105A may then process the imported data to publish a functional, query-able smart cube and/or re-publish (e.g., update) an existing smart cube, and/or table(s), using the imported data. The published or republished table(s) and/or smart cube(s) may be stored in local cache 105E. The imported data may be stored in local cache 105E until the publishing process is complete. Although operations on smart cubes or portions thereof are discussed herein, these operations may be performed on a database table or collection of tables.

Remote database 115 may include a processor 115B, a memory 115C, a network interface 115D, and/or a table generation unit 115E. Remote database 115 may be a computer, system of computers (e.g., rack server(s)), and/or a cloud service computer system. Remote database 115 may execute, by processor 115B, an operating system (O/S) and one or more instances to provide attribute data (e.g., collected at remote database 115 and stored in memory 115C). Remote database 115 may store data in or have access to table generation unit 115E (e.g., hosted on a third party server or in memory 115C). Network interface 115D may be a TCP/IP network interface for, e.g., Ethernet or wireless communications with network 110.

Figure 2:
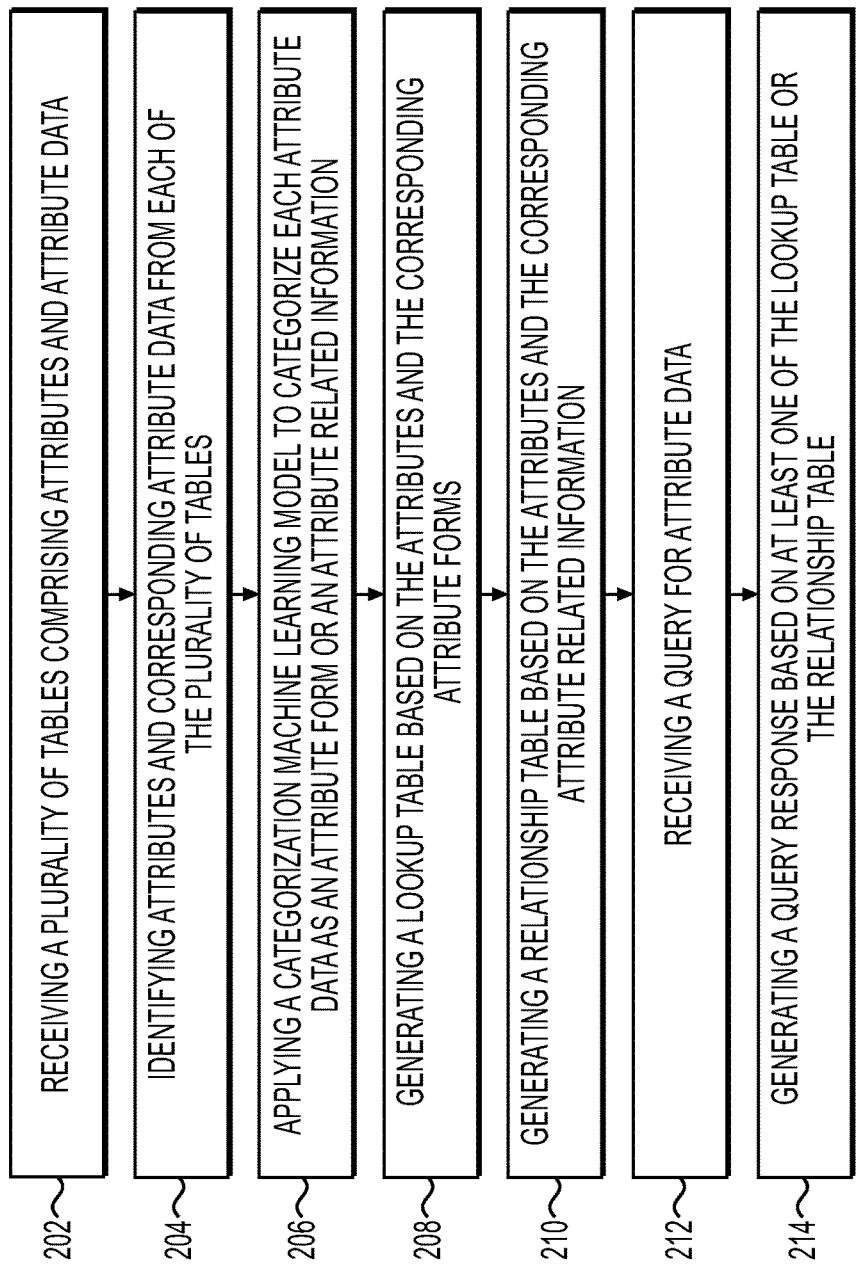
FIG. 2 depicts a flowchart for providing faster data access using lookup and relationship tables, according to one or more embodiments.

FIG. 2 depicts a flowchart 200 for providing fast access to data using lookup and/or relationship tables. At 202 of flowchart 200, a plurality of tables may be received. The plurality of tables may include attributes and attribute data. The plurality of tables may be received at, for example, local server 105A and may be provided by remote database 115. The plurality of tables may be provided via network 110 or any other applicable communication medium. It will be understood that the plurality of tables may be one or more of CSV files, CRM based files, office productivity software, cloud computing data, or the like.

One or more of the plurality of tables may include attributes and attribute data corresponding to the attributes. The attributes and attribute data may be distributed across the plurality of tables such that no single table includes all attributes and corresponding attribute data. The tables may be distributed that a first subset of tables include attributes and corresponding attribute forms, a second subset of tables include attributes and corresponding attribute related information, or a combination thereof.

According to an implementation, the information provided in the tables may be in an unreadable format (e.g., image data). Tables with information in an unreadable format may be flagged. The flag may be an indication of a null data indication or any other applicable manner. The null data indication or another applicable indication may be automatically generated upon receipt of the table or upon a lookup or relationship table generation trigger (e.g., initiated by the processor 105B of local server 105A). The null data indication or another applicable indication may be generated if no data is identified within the table or if the data identified within the table does not correspond to any attributes.

A flag may trigger a reading component to discern the content of a given table (e.g., a table provided in an unreadable format such as an image). For example, the flag may trigger an optical character recognition (OCR) process to discern the content of a given table. After the OCR process, the table may be re-evaluated to determine if it still contains unreadable content.

A flag may trigger an alarm and/or a notification. The alarm and/or notification may be stored in memory (e.g., memory 105C) and/or may be provided to a user (e.g. via electronic communication or via a display). The alarm and/or notification may be provided to the originating component that provided the table that resulted in the flag. For example, a remote database 115 may provide the table and, thus, the remote database 115 may receive a notification or alert that the data resulted in a flag. The flag at the originating component may include a request for a replacement table. For example, the table data may be corrupted during transmission of the table and, accordingly, the request for the replacement table triggered by the flag may cause the transmission of the table by the originating component.

As further discussed herein, FIG. 4A provides a simple example of a plurality of tables 400, 410, and 420. Each table 400, 410, and/or 420 may be provided from the same or different source (e.g., one or more remote databases 115). As shown, each table includes attributes in column 404, and attribute data in the remaining columns. As shown, attribute forms are provided in columns 402, and attribute related data in columns 406, 408, and 409. At 202 of FIG. 2, the tables 400, 410, and 420 may be received.

At 204 of FIG. 2, attributes and corresponding attribute data may be identified from each of the plurality of tables. According to an implementation, the attributes and attribute data may be indicated as such by a table providing entity (e.g., a remote database 115). According to another implementation, an identification machine learning model may be applied to determine the attributes and corresponding attribute data. The identification machine learning model may be trained in accordance with the process discussed in FIG. 3.

According to an implementation, the identification machine learning model may be trained using supervised learning. The identification machine learning model may be trained using tagged training data. For example, the training data may include a plurality of tables each having attributes and attribute data. The attributes may be tagged as attributes and the attribute data maybe tagged as attribute data. Accordingly, the identification machine learning model may train using the tagged data to modify its weights and/or its layers to output table content that corresponds to attributes and/or attribute data. The training may be based on a plurality of factors such as the content of the training tables corresponding to attributes and/or attribute data, the positioning of the data corresponding to attributes and/or attribute data, the layout of the data corresponding to attributes and/or attribute data, or the like.

The output of 204 may include the attributes and corresponding attribute data from each of the plurality of tables received at 202. The attributes and corresponding attribute data from each of the plurality of tables received at 202 may be stored in cache or memory (e.g., memory 105C of FIG. 1).

According to an implementation, identifying attributes and corresponding attribute data at 204 may include harmonizing the attributes and/or corresponding attribute data from across the plurality of tables that provide the attributes and/or corresponding attribute data. The identification machine learning model may harmonize the data and identify the attributes and corresponding attribute data. The harmonizing may include detecting a group (e.g., attribute, attribute data, type of attribute data, etc.) that corresponds to a given set of data. Different data (e.g., columns) that correspond to the same group but that may be designated using different identifiers may be identified as part of the same group.

For example, as shown in FIG. 4A, table 400 includes a column 402 corresponding to Item ID and table 420 includes a column 402 corresponding to Item Number. The identification machine learning model may apply contextual clues to determine that the Item ID of table 400 and the Item Number of table 420 correspond to the same group. The contextual clues may include the data associated with the dataset (e.g., column), may include the positioning of one or more data, the data associated with related datasets (e.g., one or more rows), or the like. The contextual clues may be provided to the identification machine learning model as inputs by providing the plurality of tables and their corresponding data as inputs to the identification machine learning model.

Similarly, as another example, as shown in FIG. 4A, table 400 includes column 404 corresponding to Item Descriptions and table 410 includes a column 404 corresponding to Item Name. The identification machine learning model may apply contextual clues to determine that the Item Descriptions of table 400 and the Item Name of table 410 correspond to the same group. The contextual clues may include the data associated with the dataset (e.g., column), may include the positioning of one or more data, the data associated with related datasets (e.g., one or more rows), or the like. The contextual clues may be provided to the identification machine learning model as inputs by providing the plurality of tables and their corresponding data as inputs to the identification machine learning model.

In both examples above, the harmonization may result in the columns 402 form tables 400, 410, and 420 to be grouped with each other, and columns 404 from each of the tables 400, 410, and 420 to be grouped with each other. Accordingly, related data from distributed tables may grouped to generate lookup and relationship tables, as further discussed herein.

At 206 of FIG. 2, a categorization machine learning model may be used to categorize each attribute data as an attribute form or an attribute related information. As discussed herein, an attribute form may be data having a one-to-one relationship with the attribute. An attribute from may be a characteristic that is specific to the attribute it is associated with such that it has a one-to-one relationship with the attribute. A one-to-one relationship may be a relationship that indicates that a given attribute from is associated only with a given attribute. As also discussed herein, an attribute related information may be information related to an attribute that does not have a one-to-one relationship with the attribute.

According to an implementation the categorization machine learning model may be trained using supervised learning. The categorization machine learning model may be trained using tagged training data. For example, the training data may include a plurality of tables having attribute data corresponding to either attribute forms or attribute related information. The attribute forms may be tagged as attribute forms and the attribute related information may be tagged as attribute related information. Accordingly, the categorization machine learning model may train using the tagged data to modify its weights and/or its layers to output indications of a given attribute data as being either an attribute form or an attribute related information. The training may be based on a plurality of factors such as the content of the training tables corresponding to attributes forms and/or attribute related information, the positioning of the data corresponding to attributes forms and/or attribute relationship information, the layout of the data corresponding to attributes forms and/or attribute relationship information, or the like.

At 208, a lookup table may be generated based on at least the attributes and the corresponding attribute forms. According to an implementation, the lookup table may also include the attribute related information. The lookup table may be generated based on the attributes and attribute data identified at 204. The attributes and attribute data identified at 204 may be harmonized, as disclosed herein. At least the attributes and attribute forms identified and harmonized at 204 may be organized in the lookup table in any applicable manner. The manner may be one or more of a chronological manner, space optimization manner, retrieval efficiency manner, numerical manner, ascending manner, descending manner, or the like or a combination thereof. The lookup table may be a complete repository of the plurality of distributed tables, at a given point in time. Accordingly, the lookup table may represent a complete data set that can be queried and that can provide responses to queries in a faster and more complete manner than distributed tables.

At 210, a relationship table may be generated based on the attributes and the corresponding attributed relationship information. The relationship table may be generated based on the attributes and attribute data identified at 204. The attributes and attribute data identified at 204 may be harmonized, as disclosed herein. The attributes and attribute related information identified and harmonized at 204 may be organized in the relationship table in any applicable manner.

The manner may be one or more of a chronological manner, space optimization manner, retrieval efficiency manner, numerical manner, ascending manner, descending manner, or the like or a combination thereof. The relationship table may be a complete repository of the relationships provided via the plurality of distributed tables, at a given point in time. Accordingly, the relationship table may represent a complete relationship data set that can be queried and that can provide responses to queries in a faster and more complete manner than distributed tables.

According to an implementation, the lookup and relationship tables may be the same table. For example, a cube may include the attributes identified and/or harmonized at 204, the application data identified and/or harmonized at 204, as well as the relationships between the attributes and the attribute related information.

According to an implementation, the steps 202, 204, 206, and 208 may be implemented using code. The code may be any applicable code configured to perform the steps disclosed herein, and may be, for example, a type of structured query (SQL) language. The example code provided below corresponds to SQL code in reference to the tables 400 (corresponding to an Operations Training table), 410 (corresponding to a Marketing Discounts table), and 420 (corresponding to a Safety Recalls table) provided in FIG. 4A that are received at 202.

According to an implementation, the passes disclosed below may be automatically generated by one or more machine learning models (e.g., the identification machine learning model and the characterization machine learning model.

The following four passes may be directed to identifying attributes from each of the plurality of tables at 204 of FIG. 2:

select distinct [a11].[Item_ID] [Item_ID],
   [a11].[Item_Desc] [Item_Des]
into ZZT6ML81G6HH000
from [dbo].[T1_Operations_Tran] [a11]
select distinct [a11].[Item_ID] [Item_ID],
   [a11].[Item_Des] [Item_Des],
into ZZTWU4C0VFTH001
from [dbo].[T2_Marketing_Discounts] [a11]
select distinct [a11].[Item_ID] [Item_ID],
   [a11].[Item_Des] [Item_Des],
into ZZTT45E11D5H002
from [dbo].[T3_Safety_Recalls] [a11]
select coalesce([pa11].[Item_ID], [pa12].[Item_ID], [pa13].[Item_ID]) [Item_ID],
   coalesce([pa11].[Item_Des], [pa12].[Item_Des], [pa13].[Item_Des]) [Item_Des]
into PDYFB00NJNS8YYL003
from ZZT6ML81G6HH000 [pa11]
   full outer join ZZTWU4C0VFTH001 [pa12]
   on ([pa11].[Item_ID]=[pa12].[Item_ID])
   full outer join ZZTT45E11D5H002 [pa13]
   on (coalesce([pa11].[Item_ID], [pa12].[Item_ID])=[pa13].[Item_ID])

The following passes may be directed to identifying attribute data (e.g., sub categories) from each of the polarity of tables at 204 of FIG. 2:
select distinct [a11].[Subcategory] [Subcategory]
into ZZT258D0UP5H004
from [dbo].[T2_Marketing_Discounts] [a11]
select distinct [a11].[Subcategory] [Subcategory]
into ZZTT29G0SH5H005
from [dbo].[T3_Safety_Recalls] [a11]
select coalesce([pa11].[Subcategory], [pa12].[Subcategory]) [Subcategory]
into PDYFB00NJNS92TL006
from ZZT258D0UP5H004 [pa11]
   full outer join ZZTT29G0SH5H005 [pa12]
   on ([pa11].[Subcategory]=[pa12].[Subcategory])

The following pass may be directed to identifying attribute data (e.g., seasons) from table 400, as table 400 is the only table that includes the seasons data, at 204 of FIG. 2:
select distinct [a11].[Season] [Season]
into PDYFB00NJNS94BL007
from [dbo].[T1_Operations_Tran] [a11]

The following passes may be directed to building item and subcategory relationships based on tables 410 and 420 that include the item subcategory attributes and attribute related information, at 210:
select distinct [a11].[Item_ID] [Item_ID],
   [a11].[Item_Desc] [Item_Des]
   [a11].[Subcategory] [Subcatgory]
into ZZT6ML81G6HH008
from [dbo].[T2_Marketing_Discounts] [a11]
select distinct [a11].[Item_ID] [Item_ID],
   [a11].[Item_Desc] [Item_Des]
   [a11].[Subcategory] [Subcatgory]
into ZZT6ML81G6HH009
from [dbo].[T3_Safety_Recalls] [a11]
select coalesce([pa11].[Item_ID], [pa12].[Item_ID]) [Item_ID],
   coalesce([pa11].[Item_Des], [pa12].[Item_Des]) [Item_Des],
   coalesce([pa11].[Subcategory], [pa12].[Subcategory]) [Subcategory]
into PDYFB00NJNS95JR010
from ZZT6ML81G6HH008 [pa11]
   full outer join ZZT6ML81G6HH009 [pa12]
   on ([pa11].[Item_ID]=[pa12].[Item_ID])

The following passes may be directed to using a previously generated relationship table during query execution. The previously generated table may be used for the relationship between item and subcategory:
select [a11].[Month] [Month],
   [a12].[Subcategory] [Subcategory],
   sum([a11].[Revenue]) [WJXBFS1]
from [dbo].[T1_Operations_Tran] [a11]
   join [dbo].[PDYFB00NJNS95JR010] [a12]
   on ([a11].[Item_ID]=[a12].[Item_ID])
group by [a11].[Month],
   [a12].[Subcategory]

FIG. 4B shows an example lookup and relationship table 450 comprising the attributes of the tables 400, 410, and 420 of FIG. 4A. At 212 of FIG. 2, a query for attribute data associated with an attribute may be received. The query may be for an attribute form or may be for an attribute related information or relationship. A query response may be generated based on at least one of the lookup or relationship table, or a combined lookup and relationship table, at 214. For example, a query may request the revenue generated by apple sales in the highest selling season for apples. Accordingly, the highest revenue generating season for apples may be identified as fall, and the corresponding revenue of $10,000 may be provided in response to the query by accessing the table 450.

According to an implementation, the lookup table and relationship tables generated at 208 and 210 may be updated from time to time. The frequency of updating the tables may be determined based on one or more of historical data changes, receipt of updated distributed tables, and/or an updating machine learning model configured to determine the update frequency based on one or more of the historical data changes, updated distributed tables, query frequency, types of queries, or the like. The updating machine learning model may be trained to optimize the resources expended to update the lookup and relationship tables (e.g., the frequency of data transfer, access to storage, etc.) and the benefits of updated data. For example, the updating machine learning model may determine that a given set of data is queried at a higher rate than other data. Accordingly, the updating machine learning model may determine the overall update frequency of that data via a distributed table, and set the update frequency for the lookup and relationship tables based on the update frequency of the distributed table. According to an implementation, tables may be updated based on a quote system that designates an amount of space that can be occupied by the lookup and relationship tables. Based on the quota, multiple lookup and relationship tables may be stored and updated and/or deleted. A request for additional space may be made based on the historical quires (e.g., to store multiple lookup and relationship tables based on multiple different queries).

Figure 3:
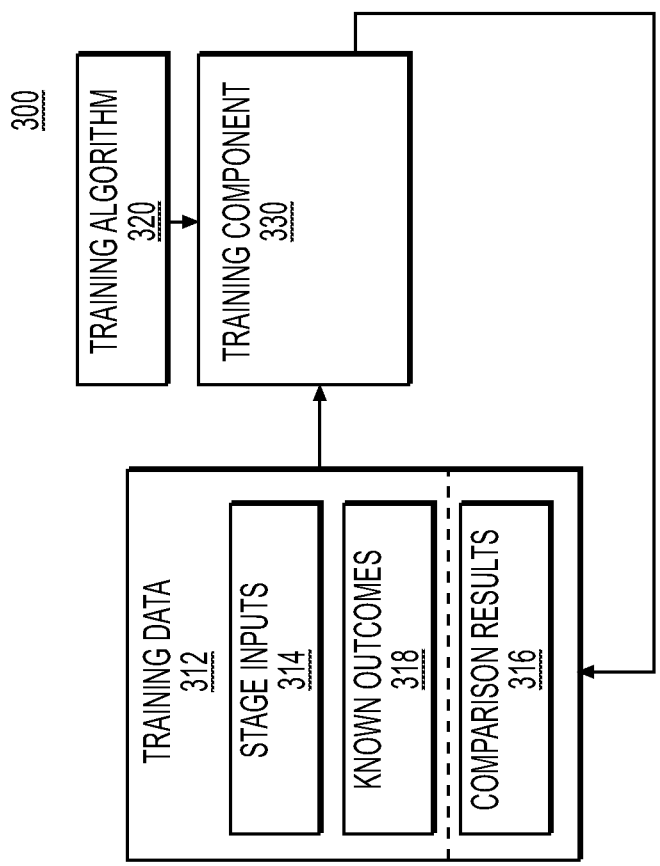
FIG. 3 depicts a data flow for training a machine learning model, according to one or more embodiments.

One or more implementations disclosed herein include a machine learning model (e.g., the identification machine learning model, the categorization machine learning model, the updating machine learning model). A machine learning model disclosed herein may be trained using the data flow 300 of FIG. 3. As shown in FIG. 3, training data 312 may include one or more of stage inputs 314 and known outcomes 318 related to a machine learning model to be trained. The stage inputs 314 may be from any applicable source including attributes, attribute forms, attribute related information, historical information, etc. (e.g., one or more outputs from a step from flowchart 200 of FIG. 2). The known outcomes 318 may be included for machine learning models generated based on supervised or semi-supervised training. An unsupervised machine learning model may not be trained using known outcomes 318. Known outcomes 318 may include known or desired outputs for future inputs similar to or in the same category as stage inputs 314 that do not have corresponding known outputs.

The training data 312 and a training algorithm 320 may be provided to a training component 330 that may apply the training data 312 to the training algorithm 320 to generate a machine learning model. The machine learning model may be generated by adjusting one or more weights or one or more layers of an untrained model. According to an implementation, the training component 330 may be provided comparison results 316 that compare a previous output of the corresponding machine learning model to apply the previous result to re-train the machine learning model. The comparison results 316 may be used by the training component 330 to update the corresponding machine learning model. The training algorithm 320 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

While techniques discussed herein discuss steps performed by a local server 105A, client 102 and/or steps performed by remote database 115, some of the steps may be performed on a single device, such as one or more remote database 115 or local server 105A. Alternatively, these steps may be practiced on more devices than local server 105A and remote database 115. For example, there may be more than one local server 105A and/or more than one remote database 115.

In general, any process or operation discussed in this disclosure that is understood to be computer-implementable, such as the process illustrated in FIGS. 2 and 3, may be performed by one or more processors of a computer system, such any of the systems or devices in the computing system of FIG. 1 as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

Figure 5:
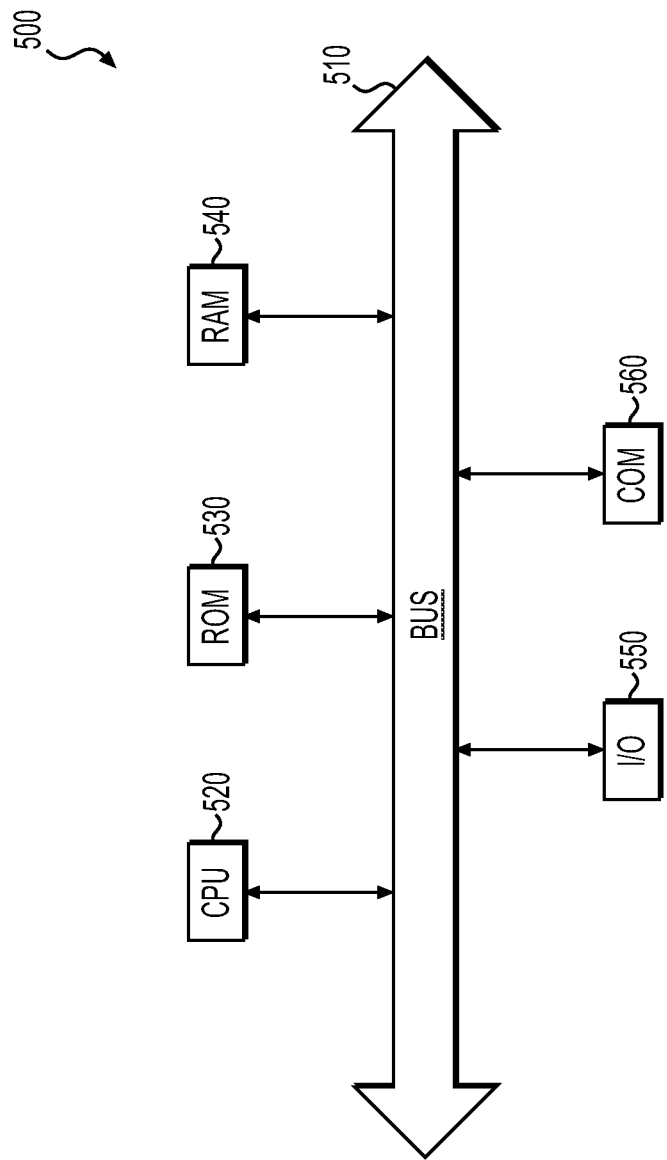
FIG. 5 depicts an example system that may execute techniques presented herein.

FIG. 5 depicts an example system 500 that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for decreasing data access time using a lookup table and a relationship table, the method comprising:

receiving a trained categorization machine learning model trained using training data including a plurality of training tables comprising attribute data corresponding to attribute forms having a one-to-one relationship with an attribute among a plurality of attributes or attribute related information not having a one-to-one relationship with an attribute among the plurality of attributes, in which the attribute forms are tagged as attribute forms and the attribute related information is tagged as attribute related information;

receiving a plurality of tables comprising a plurality of attributes and attribute data, the attribute data comprising attribute forms having a one-to-one relationship with an attribute among the plurality of attributes and attribute related information not having a one-to-one relationship with an attribute among the plurality of attributes;

identifying attributes and corresponding attribute data from each of the plurality of tables;

applying the trained categorization machine learning model to categorize each attribute data as an attribute form having a one-to-one relationship with an attribute among the plurality of attributes or an attribute related information not having a one-to-one relationship with an attribute among the plurality of attributes;

generating the lookup table based on the attributes and the corresponding attribute forms having a one-to-one relationship with an attribute among the plurality of attributes;

generating the relationship table based on the attributes and the corresponding attribute related information not having a one-to-one relationship with an attribute among the plurality of attributes;

receiving a query for attribute data; and generating a query response based on at least one of the lookup table or the relationship table.

2. The method of claim 1, wherein the lookup table is further based on attribute related information corresponding to the attributes.

3. The method of claim 1, wherein the plurality of tables are provided by one or more remote databases.

4. The method of claim 1, wherein identifying attributes and corresponding attribute data from each of the plurality of tables comprises:
provniding the plurality of tables to an identification machine learning model; and
receiving an output comprising the identified attributes and corresponding attribute data from the identification machine learning model.

5. The method of claim 1, wherein the lookup table and the relationship table are a unified table.

6. The method of claim 1, wherein at least one of the lookup table or the relationship table is labeled.

7. The method of claim 6, wherein the label is based on one or more of a pushdown table prefix, a hash of a server index, a hash of a job identifier, a database connection index, a hash of a timestamp, a pushdown table type, or a counter.

8. The method of claim 1, further comprising releasing at least one of the lookup table or the relationship table based on a space quota and a last use time.

9. A system for decreasing data access time using a lookup table and a relationship table, the system comprising:
at least one memory storing instructions; and
at least one processor executing the instructions to perform operations, the operations comprising:
receiving a trained categorization machine learning model trained using training data including a plurality of training tables comprising attribute data corresponding to attribute forms having a one-to-one relationship with an attribute among a plurality of attributes or attribute related information not having a one-to-one relationship with an attribute among the plurality of attributes, in which the attribute forms are tagged as attribute forms and the attribute related information is tagged as attribute related information;
receiving a plurality of tables comprising a plurality of attributes and attribute data, the attribute data comprising attribute forms having a one-to-one relationship with an attribute among the plurality of attributes and attribute related information not having a one-to-one relationship with an attribute among the plurality of attributes;
identifying attributes and corresponding attribute data from each of the plurality of tables;
applying the trained categorization machine learning model to categorize each attribute data as an attribute form having a one-to-one relationship with an attribute among the plurality of attributes or an attribute related information not having a one-to-one relationship with an attribute among the plurality of attributes;
generating the lookup table based on the attributes and the corresponding attribute forms having a one-to-one relationship with an attribute among the plurality of attributes;
generating the relationship table based on the attributes and the corresponding attribute related information not having a one-to-one relationship with an attribute among the plurality of attributes;
receiving a query for attribute data; and
generating a query response based on at least one of the lookup table or the relationship table.

10. The system of claim 9, wherein the lookup table is further based on attribute related information corresponding to the attributes.

11. The system of claim 9, wherein the plurality of tables are provided by one or more remote databases.

12. The system of claim 9, wherein identifying attributes and corresponding attribute data from each of the plurality of tables comprises:
providing the plurality of tables to an identification machine learning model; and
receiving an output comprising the identified attributes and corresponding attribute data from the identification machine learning model.

13. The system of claim 9, wherein the lookup table and the relationship table are a unified table.

14. The system of claim 9, wherein at least one of the lookup table or the relationship table is labeled.

15. The system of claim 14, wherein the label is based on one or more of a pushdown table prefix, a hash of a server index, a hash of a job identifier, a database connection index, a hash of a timestamp, a pushdown table type, or a counter.

16. A non-transitory computer-readable medium storing instructions that, when executed by a processor, cause the processor to perform operations, the operations comprising:
receiving a trained categorization machine learning model trained using training data including a plurality of training tables comprising attribute data corresponding to attribute forms having a one-to-one relationship with an attribute among a plurality of attributes or attribute related information not having a one-to-one relationship with an attribute among the plurality of attributes, in which the attribute forms are tagged as attribute forms and the attribute related information is tagged as attribute related information;
receiving a plurality of tables comprising a plurality of attributes and attribute data, the attribute data comprising attribute forms having a one-to-one relationship with an attribute among the plurality of attributes and attribute related information not having a one-to-one relationship with an attribute among the plurality of attributes;
identifying attributes and corresponding attribute data from each of the plurality of tables;
applying the trained categorization machine learning model to categorize each attribute data as an attribute form having a one-to-one relationship with an attribute among the plurality of attributes or an attribute related information not having a one-to-one relationship with an attribute among the plurality of attributes;
generating a lookup table based on the attributes and the corresponding attribute forms having a one-to-one relationship with an attribute among the plurality of attributes;
generating a relationship table based on the attributes and the corresponding attribute related information not having a one-to-one relationship with an attribute among the plurality of attributes;
receiving a query for attribute data; and
generating a query response based on at least one of the lookup table or the relationship table.

17. The non-transitory computer-readable medium of claim 16, wherein the lookup table is further based on attribute related information corresponding to the attributes.

18. The non-transitory computer-readable medium of claim 16, wherein the plurality of tables are provided by one or more remote databases.

19. The non-transitory computer-readable medium of claim 16, wherein identifying attributes and corresponding attribute data from each of the plurality of tables comprises:
    providing the plurality of tables to an identification machine learning model; and
    receiving an output comprising the identified attributes and corresponding attribute data from the identification machine learning model.

20. The non-transitory computer-readable medium of claim 16, wherein the lookup table and the relationship table are a unified table.

* * * * *